(12) United States Patent
Swarbrick et al.

(10) Patent No.: US 10,505,548 B1
(45) Date of Patent: Dec. 10, 2019

(54) MULTI-CHIP STRUCTURE HAVING CONFIGURABLE NETWORK-ON-CHIP

(71) Applicant: Xilinx, Inc., San Jose, CA (US)

(72) Inventors: Ian A. Swarbrick, Santa Clara, CA (US); Ahmad R. Ansari, San Jose, CA (US); David P. Schultz, Longmont, CO (US); Kin Yip Sit, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/990,506

(22) Filed: May 25, 2018

(51) Int. Cl.
    *G06F 7/38* (2006.01)
    *H03K 19/173* (2006.01)
    *G06F 21/76* (2013.01)
    *G06F 12/14* (2006.01)

(52) U.S. Cl.
    CPC ..... *H03K 19/1776* (2013.01); *G06F 12/1425* (2013.01); *G06F 21/76* (2013.01); *H03K 19/17768* (2013.01)

(58) Field of Classification Search
    None
    See application file for complete search history.

(56) References Cited

U.S. PATENT DOCUMENTS

| | | |
|---|---|---|
| 6,781,407 B2 | 8/2004 | Schultz |
| 7,185,309 B1 | 2/2007 | Kulkarni et al. |
| 7,199,608 B1 | 4/2007 | Trimberger |
| 7,281,093 B1 | 10/2007 | Kulkarni et al. |
| 7,301,822 B1 | 11/2007 | Walstrum, Jr. et al. |
| 7,454,658 B1 | 1/2008 | Baxter |
| 7,328,335 B1 | 2/2008 | Sundararajan et al. |
| 7,380,035 B1 | 5/2008 | Donlin |
| 7,420,392 B2 | 9/2008 | Schultz et al. |
| 7,500,060 B1 | 3/2009 | Anderson et al. |
| 7,521,961 B1 | 4/2009 | Anderson |
| 7,574,680 B1 | 8/2009 | Kulkarni et al. |
| 7,576,561 B1 | 8/2009 | Huang |

(Continued)

OTHER PUBLICATIONS

U.S. Appl. No. 15/936,916, filed Mar. 27, 2018, Swarbrick, I.A., et al., San Jose, CA USA.

(Continued)

*Primary Examiner* — Anh Q Tran
(74) *Attorney, Agent, or Firm* — Patterson + Sheridan, LLP (57) ABSTRACT

A multi-chip structure that implements a configurable Network-on-Chip (NoC) for communication between chips is described herein. In an example, an apparatus includes a first chip comprising a first processing system and a first configurable NoC connected to the first processing system, and includes a second chip comprising a second processing system and a second configurable NoC connected to the second processing system. The first and second configurable NoCs are connected together via an external connector. The first and second processing systems are operable to obtain first and second information from off of the first and second chip and configure the first and second configurable NoCs based on the first and second information, respectively. The first and second processing systems are communicatively coupled with each other via the first and second configurable NoCs when the first and second configurable NoCs are configured based on the first and second information, respectively.

20 Claims, 7 Drawing Sheets

(56) References Cited

U.S. PATENT DOCUMENTS

| | | | |
|---|---|---|---|
| 7,650,248 | B1 | 1/2010 | Baxter |
| 7,653,820 | B1 | 1/2010 | Trimberger |
| 7,689,726 | B1 | 3/2010 | Sundararajan et al. |
| 7,788,625 | B1 | 8/2010 | Donlin et al. |
| 7,831,801 | B1 | 11/2010 | Anderson |
| 8,006,021 | B1 | 8/2011 | Li et al. |
| 8,020,163 | B2 | 9/2011 | Nollet et al. |
| 8,214,694 | B1 | 7/2012 | McKechnie et al. |
| 9,030,227 | B1 * | 5/2015 | Cashman ......... H03K 19/00392 326/10 |
| 9,152,794 | B1 | 10/2015 | Sanders et al. |
| 9,165,143 | B1 | 10/2015 | Sanders et al. |
| 9,230,112 | B1 | 1/2016 | Peterson et al. |
| 9,323,876 | B1 | 4/2016 | Lysaght et al. |
| 9,336,010 | B2 | 5/2016 | Kochar |
| 9,411,688 | B1 | 8/2016 | Poolla et al. |
| 9,652,252 | B1 | 5/2017 | Kochar et al. |
| 9,652,410 | B1 | 5/2017 | Schelle et al. |
| 10,243,882 | B1 | 3/2019 | Swarbrick et al. |
| 2003/0208566 | A1 | 11/2003 | Weber et al. |
| 2004/0114609 | A1 | 6/2004 | Swarbrick et al. |
| 2004/0210695 | A1 | 10/2004 | Weber et al. |
| 2008/0320255 | A1 | 12/2008 | Wingard et al. |
| 2008/0320268 | A1 | 12/2008 | Wingard et al. |
| 2010/0030924 | A1 | 2/2010 | Shankar et al. |
| 2012/0036296 | A1 | 2/2012 | Wingard et al. |
| 2014/0177626 | A1 * | 6/2014 | Thottethodi ......... G06F 17/5068 370/351 |
| 2015/0103822 | A1 | 4/2015 | Gianchandani et al. |
| 2015/0109024 | A1 * | 4/2015 | Abdelfattah ......... G06F 17/5054 326/41 |
| 2015/0188847 | A1 | 7/2015 | Chopra et al. |
| 2017/0140800 | A1 | 5/2017 | Wingard et al. |

OTHER PUBLICATIONS

U.S. Appl. No. 15/588,321, filed May 5, 2017, Camarota, R., et al., San Jose, CA USA.

U.S. Appl. No. 15/904,211, filed Feb. 23, 2018, Swarbrick, Ian A., San Jose, CA USA.

U.S. Appl. No. 15/964,901, filed Apr. 27, 2018, Swarbrick, Ian A., San Jose, CA USA.

Dally, William J. et al., "Deadlock=Free Message Routing in Multiprocessor Interconnection Networks," IEEE Transactions on Computers, May 1987, pp. 547-553, vol. C-36, No. 5, IEEE, Piscataway, New Jersey, USA.

Glass, Christopher et al., "The Turn Model for Adaptive Routing," Journal of the Association for Computing Machinery, Sep. 1994, pp. 874-902, vol. 41, No. 5, ACM, New York, New York, USA.

Rantala, Ville et al., "Network on Chip Routing Algorithms," TUCS Techncal Report No. 779, Aug. 2006, pp. 1-38, Turku Centre for Computer Science, Turku, Finland.

U.S. Appl. No. 15/886,583, filed Feb. 1, 2018, Swarbrick, Ian A., et al., San Jose, CA USA.

U.S. Appl. No. 16/041,473, filed Jul. 20, 2018, Swarbrick, Ian A., et al., San Jose, CA USA.

U.S. Appl. No. 16/106,691, filed Aug. 21, 2018, Swarbrick, Ian A., et al., San Jose, CA USA.

Xilinx, Inc., "Zynq-7000 AP SoC—32 Bit DDR Access with ECC Tech Tip", 15 pages, printed on Aug. 10, 2018, http://www.wiki.xilinx.com/Zynq-7000+AP+SoC+-+32+Bit+DDR+Access+with+ECC+Tech+Tip, San Jose, CA USA.

* cited by examiner

MULTI-CHIP STRUCTURE HAVING CONFIGURABLE NETWORK-ON-CHIP

TECHNICAL FIELD

Examples of the present disclosure generally relate to multi-chip structures and, in particular, to multi-chip structures that implement a configurable Network-on-Chip (NoC) for communication between chips.

BACKGROUND

Advances in integrated circuit technology have made it possible to embed an entire system, such as including a processor core, a memory controller, and a bus, in a single semiconductor chip. This type of chip is commonly referred to as a system-on-chip (SoC). Other SoCs can have different components embedded therein for different applications. The SoC provides many advantages over traditional processor-based designs. It is an attractive alternative to multi-chip designs because the integration of components into a single device increases overall speed while decreasing size. The SoC is also an attractive alternative to fully customized chips, such as an application specific integrated circuit (ASIC), because ASIC designs tend to have a significantly longer development time and larger development costs. A configurable SoC (CSoC), which includes programmable logic, has been developed to implement a programmable semiconductor chip that can obtain benefits of both programmable logic and SoC.

SUMMARY

A multi-chip structure that implements a configurable Network-on-Chip (NoC) for communication between chips is described herein. A minimal configuration for the configurable NoC of each chip can be enabled to establish communications between the chips to permit communications for further configuration.

An example of the present disclosure is an apparatus. The apparatus includes a first chip comprising a first processing system and a first configurable Network-on-Chip (NoC) connected to the first processing system, and includes a second chip comprising a second processing system and a second configurable NoC connected to the second processing system. The first configurable NoC is connected to the second configurable NoC via an external connector. The first processing system is operable to obtain first information from off of the first chip and configure the first configurable NoC based on the first information. The second processing system is operable to obtain second information from off of the second chip and configure the second configurable NoC based on the second information. The first processing system and the second processing system are communicatively coupled with each other via the first configurable NoC and the second configurable NoC when the first configurable NoC and the second configurable NoC are configured based on the first information and the second information, respectively.

Another example of the present disclosure is a method for operating multiple integrated circuits. Locally at each chip of multiple chips by a controller of the respective chip, a configurable Network-on-Chip (NoC) of the respective chip is configured based on initial configuration data. The configurable NoCs of the multiple chips are connected via external connectors external to the multiple chips. System configuration data is communicated between the controllers of the multiple chips via the configurable NoCs of the multiple chips configured based on the initial configuration data. Locally at each chip by the controller of the respective chip, the configurable NoC of the respective chip is configured based on the system configuration data.

Another example of the present disclosure is a method for operating multiple integrated circuits. A first processing system on a first chip is communicatively connected to a second processing system on a second chip via a first configurable Network-on-Chip (NoC) on the first chip and a second configurable NoC on the second chip. A first transaction request is transmitted from the first processing system through the first configurable NoC and the second configurable NoC to the second processing system. A second transaction request corresponding to the first transaction request is transmitted from the second processing system to a configurable component on the second chip via a peripheral interconnect on the second chip. The second processing system is operable to configure the second configurable NoC via the peripheral interconnect.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Examples described herein provide for a multi-chip structure that implements a configurable Network-on-Chip (NoC) for communication between chips. In some examples, each chip of the multi-chip structure reads data from off-chip that indicates how a configurable NoC of the respective chip is to be configured for a minimal configuration to establish communications between the chips. Each chip configures its NoC according to the minimal configuration, and thereafter, the chips may communicate with others of the chips through the NoCs. The communication between the chips may include communicating system-level configuration data, which may be used to re-configure the NoCs, for example. The NoCs may be configured using a peripheral interconnect to write data to register blocks of switches of the respective NoC. Further, once the NoCs are configured to permit communication between chips, a master on one chip can communicate with slave endpoint circuits (e.g., the register blocks of the switches) on another chip via the interconnected NoCs and the peripheral interconnect of the chip on which the slave endpoint circuit is disposed.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Figure 1:
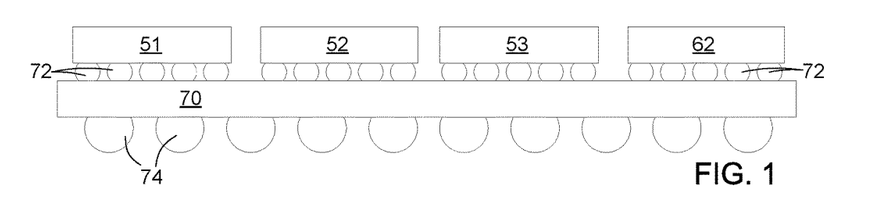
FIG. 1 is a block diagram of a multi-chip structure according to an example.

FIG. 1 is a block diagram of a multi-chip structure, such as a two-and-a-half-dimensional integrated circuit (2.5DIC) structure, according to an example. The 2.5DIC structure includes a first chip 51, a second chip 52, a third chip 53, and a memory chip 62 attached to an interposer 70 or another substrate. In other examples, the 2.5DIC structure may have fewer or more chips, and the memory chip 62 may be outside of, but communicatively coupled to, the 2.5DIC structure. Each of the first chip 51, second chip 52, and third chip 53 can include is an integrated circuit (IC), such as a system-on-chip (SoC) as described below. The memory chip 62 can comprise any form of memory for storing data, such as a configuration file. The first chip 51, second chip 52, third chip 53, and memory chip 62 are attached to the interposer 70 by electrical connectors 72, such as microbumps, controlled collapse chip connection (C4) bumps, or the like. Electrical connectors 74 on a side of the interposer 70 opposite from the chips 51, 52, 53, 62 for attaching the 2.5DIC structure to another substrate, such as a package substrate, for example. The electrical connectors 74 may be C4 bumps, ball grid array (BGA) balls, or the like.

The interposer 70 includes electrical interconnects that electrically connect various ones of the chips 51, 52, 53, 62. The electrical interconnects can include one or more metallization layers or redistribution layers on the side of the interposer 70 on which the chips 51, 52, 53, 62 are attached, one or more through substrate vias (TSVs) through the bulk substrate (e.g., silicon substrate) of the interposer 70, and/or one or more metallization layers or redistribution layers on the side of the interposer 70 opposing the side on which the chips 51, 52, 53, 62 are attached. Hence, various signals, packets, etc. can be communicated between various ones of the chips 51, 52, 53, 62.

In other examples, more or fewer chips may be included, and the chips may be in other configurations. For example, more or fewer chips that include a SoC may be implemented, such as two, four, or more chips, and more or fewer memory chips may be included. In some examples, the multi-chip structure can include various stacked chips, such as in a three-dimensional IC (3DIC) structure. For example, two or more memory chips may be stacked on each other with the bottom memory chip being attached to the interposer 70. Other multi-chip structures may be implemented in other examples, such as without an interposer. Various modifications may be made that would be readily apparent to a person having ordinary skill in the art.

Figure 2:
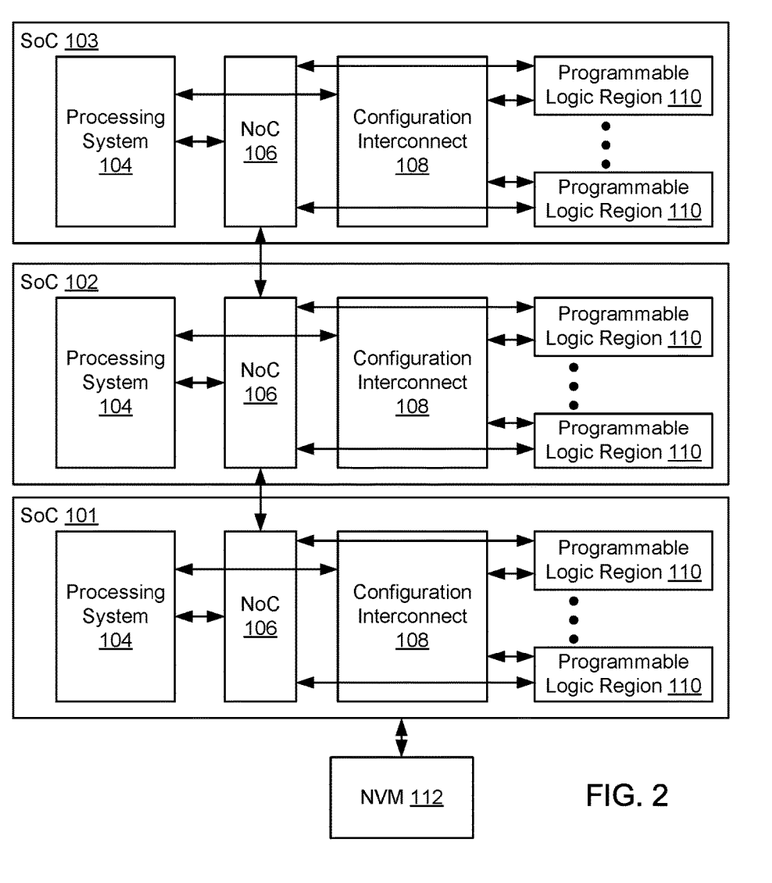
FIG. 2 is a block diagram depicting a multi-chip structure with multiple chips each having a system-on-chip (SoC) according to an example.

FIG. 2 is a block diagram depicting a multi-chip structure with multiple chips each having a SoC according to an example. The multi-chip structure includes a first SoC 101 (e.g., on the first chip 51 of FIG. 1), a second SoC 102 (e.g., on the second chip 52), and a third SoC 103 (e.g., on the third chip 53). Each SoC 101, 102, 103 is an IC comprising a processing system 104, a network-on-chip (NoC) 106, a configuration interconnect 108, and one or more programmable logic regions 110. Each SoC 101, 102, 103 can be coupled to external circuits, and as illustrated, the first SoC 101 is coupled to nonvolatile memory (NVM) 112 (e.g., on the memory chip 62 in FIG. 1). The NVM 112 can store data that can be loaded to the SoCs 101, 102, 103 for configuring the SoCs 101, 102, 103, such as configuring the NoC 106 and the programmable logic region(s) 110. As illustrated in FIGS. 1 and 2, the NVM 112 is on the memory chip 62 attached to the interposer 70; however, in other examples, memory, such as flash memory, can be external to the multi-chip structure and communicatively coupled to the SoC 101, such as via an serial peripheral interface (SPI). For example, the memory may be attached to a same package substrate to which the multi-chip structure is attached, and may communicate with the SoC 101 via the package substrate. In general, the processing system 104 of each SoC 101, 102, 103 is connected to the programmable logic region(s) 110 through the NoC 106 and through the configuration interconnect 108.

The processing system 104 of each SoC 101, 102, 103 can include one or more processor cores. For example, the processing system 104 can include a number of ARM-based embedded processor cores. The programmable logic region(s) 110 of each SoC 101, 102, 103 can include any number of configurable logic blocks (CLBs), which may be programmed or configured using the processing system 104 through the configuration interconnect 108 of the respective SoC 101, 102, 103. For example, the configuration interconnect 108 can enable, for example, frame-based programming of the fabric of the programmable logic region(s) 110 by a processor core of the processing system 104 (such as a platform management controller (PMC) described further below).

The NoC 106 includes end-to-end Quality-of-Service (QoS) features for controlling data-flows therein. In examples, the NoC 106 first separates data-flows into designated traffic classes. Data-flows in the same traffic class can either share or have independent virtual or physical transmission paths. The QoS scheme applies two levels of priority across traffic classes. Within and across traffic classes, the NoC 106 applies a weighted arbitration scheme to shape the traffic flows and provide bandwidth and latency that meets the user requirements. Examples of the NoC 106 are discussed further below. The NoC 106 is independent from the configuration interconnect 108, for example. The processing system 104, programmable logic regions 110, and/or other components of each SoC 101, 102, 103 can be selectively communicatively connected together via the NoC 106 of the respective SoC 101, 102, 103. Further, the NoCs 106 of the SoCs 101, 102, 103 are communicatively connected, such as through external electrical connections on an interposer (e.g., interposer 70).

Figure 3:
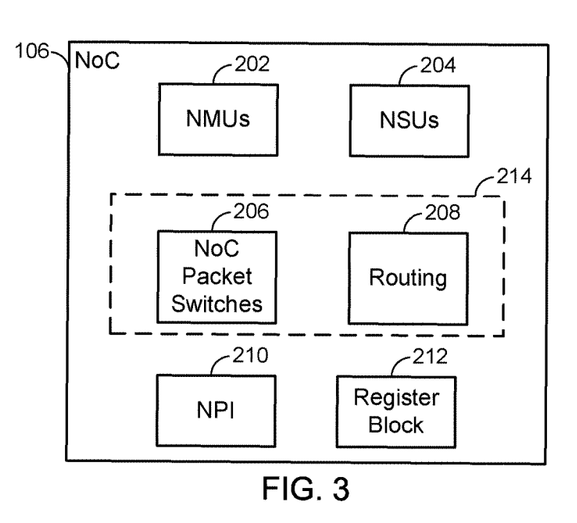
FIG. 3 is a block diagram depicting a network-on-chip (NoC) of a SoC according to an example.

FIG. 3 is a block diagram depicting the NoC 106 of a SoC according to an example. The NoC 106 includes NoC master units (NMUs) 202, NoC slave units (NSUs) 204, a network 214, NoC peripheral interconnect (NPI) 210, and register blocks 212. Each NMU 202 is an ingress circuit that connects a master circuit to the NoC 106. Each NSU 204 is an egress circuit that connects the NoC 106 to a slave endpoint circuit. The NMUs 202 are connected to the NSUs 204 through the network 214. In an example, the network 214 includes NoC packet switches 206 and routing 208 between the NoC packet switches 206. Each NoC packet switch 206 performs switching of NoC packets. The NoC packet switches 206 are connected to each other and to the NMUs 202 and NSUs 204 through the routing 208 to implement a plurality of physical channels. The NoC packet switches 206 also support multiple virtual channels per physical channel. The NPI 210 includes circuitry to program the NMUs 202, NSUs 204, and NoC packet switches 206. For example, the NMUs 202, NSUs 204, and NoC packet switches 206 can include register blocks 212 that determine functionality thereof. The NPI 210 includes a peripheral interconnect coupled to the register blocks 212 for programming thereof to set functionality. The register blocks 212 in the NoC 106 support interrupts, QoS, error handling and reporting, transaction control, power management, and address mapping control. Configuration data for the NoC 106 can be stored in the NVM 112 and provided to the NPI 210 for programming the NoC 106 and/or other slave endpoint circuits.

Figure 4:
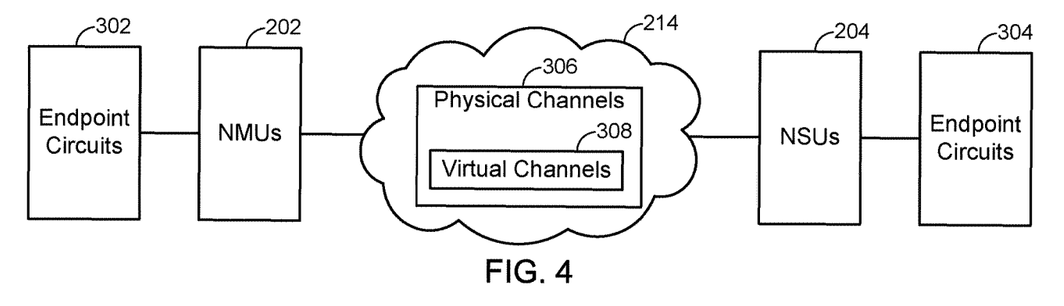
FIG. 4 is a block diagram depicting connections between endpoint circuits in a SoC through the NoC according to an example.

FIG. 4 is a block diagram depicting connections between endpoint circuits in a SoC through the NoC 106 according to an example. In the example, endpoint circuits 302 are connected to endpoint circuits 304 through the NoC 106. The endpoint circuits 302 are master circuits, which are coupled to NMUs 202 of the NoC 106. The endpoint circuits 304 are slave circuits coupled to the NSUs 204 of the NoC 106. Each endpoint circuit 302 and 304 can be a circuit in the processing system 104, a circuit in a programmable logic region 110, or a circuit in another subsystem. Each endpoint circuit in the programmable logic region 110 can be a dedicated circuit (e.g., a hardened circuit) or a circuit configured in programmable logic.

The network 214 includes a plurality of physical channels 306. The physical channels 306 are implemented by programming the NoC 106. Each physical channel 306 includes one or more NoC packet switches 206 and associated routing 208. An NMU 202 connects with an NSU 204 through at least one physical channel 306. A physical channel 306 can also have one or more virtual channels 308.

Figure 5:
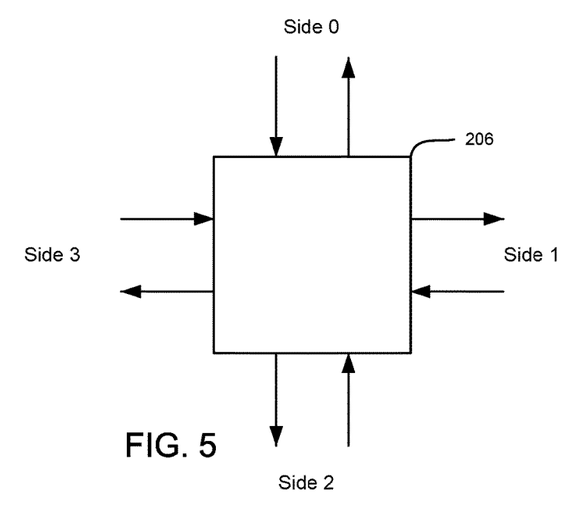
FIG. 5 is a block diagram depicting a NoC packet switch according to an example.

FIG. 5 is a block diagram depicting a NoC packet switch 206 according to an example. As illustrated, the NoC packet switch 206 has four bi-directional connections or ports (each labeled a "side" for convenience). In other examples, a NoC packet switch 206 can have more or fewer connections or ports. The NoC packet switch 206 has a first side Side 0, a second side Side 1, a third side Side 2, and a fourth side Side 3. The NoC packet switch 206 includes a register block 212 for configuring the functionality of the NoC packet switch 206. The register block 212 includes addressable registers, for example. The register block 212 includes a configuration register and a routing table. The configuration register can set a configuration mode of the NoC packet switch 206, as described in FIG. 6, for example, and the routing table can identify how packets received at the NoC packet switch 206 are to be routed based on the configuration mode.

Figure 6:
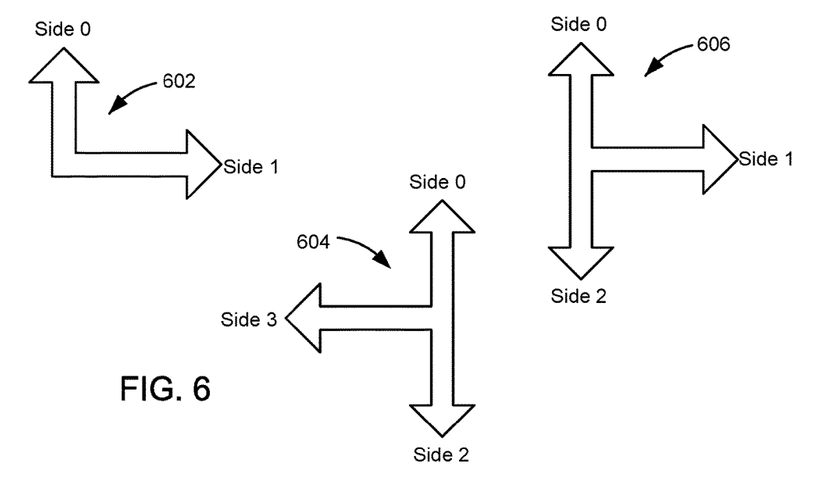
FIG. 6 is example configurations of a NoC packet switch according to an example.

FIG. 6 illustrates example configurations of a NoC packet switch 206 according to an example. FIG. 6 shows a first configuration 602, a second configuration 604, and a third configuration 606. A NoC packet switch 206 can have more, fewer, or different configurations in other examples. The configurations can be implemented using the configuration register and routing table in the NoC packet switch 206. In a default configuration, the NoC packet switch 206 acts as a pass-through. A packet entering on the first side Side 0 exits on the third side Side 2, and vice versa. Further, a packet entering on the second side Side 1 exits on the fourth side Side 3, and vice versa. In the first configuration 602, a packet entering on the first side Side 0 exits on the second side Side 1, and a packet entering on the second side Side 1 exits on the first side Side 0. In the second configuration 604, a packet entering on one of the first side Side 0, the third side Side 2, or the fourth side Side 3 exits on another one of the first side Side 0, the third side Side 2, or the fourth side Side 3 based on a destination identification of the packet being routed. In the third configuration 606, a packet entering on one of the first side Side 0, the second side Side 1, or the third side Side 2 exits on another one of the first side Side 0, the second side Side 1, or the third side Side 2 based on a destination identification of the packet being routed. The NoC packet switch 206 illustrated in FIG. 6 has connectivity using 3 sides, and in other examples, connectivity can use fewer (e.g., 2) connections or more (e.g., 4) connections depending on where connectivity is desired to be established. Additional details of example configurations will be described in the context of further examples.

Figure 7:
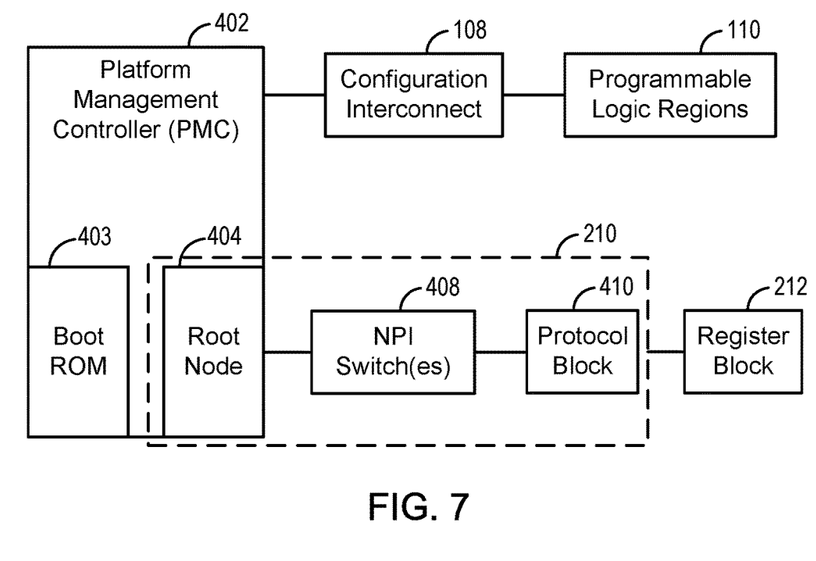
FIG. 7 is a block diagram depicting connections to a register block of a NoC packet switch through a NoC Peripheral Interconnect (NPI) according to an example.

FIG. 7 is a block diagram depicting connections to a register block 212 of a NoC packet switch 206 through the NPI 210 in a SoC 101, 102, 103 according to an example. To connect to a register block 212, the NPI 210 includes a root node 404, interconnected NPI switches 408, and a protocol block 410. The root node 404 resides on a platform management controller (PMC) 402, which as show in subsequent examples, further resides in the processing system 104 of the SoC 101, 102, 103. The PMC 402 includes a local boot read only memory (ROM) 403 for storing boot sequence instructions, for example.

Generally, the root node 404 can packetize a transaction request, such as a write or read request, into a format implemented by the NPI 210 and can transmit a memory-mapped transaction request to interconnected NPI switches 408. The transaction request can be routed through the interconnected NPI switches 408 to a protocol block 410 connected to the register block 212 to which the transaction request is directed. The protocol block 410 can then translate the memory-mapped transaction request into a format implemented by the register block 212 and transmit the translated request to the register block 212 for processing. The register block 212 can further transmit a response to the transaction request through the protocol block 410 and the interconnected NPI switches 408 to the root node 404, which then responds to the master circuit that issued the transaction request.

The root node 404 can translate a transaction request between a protocol used by the one or more master circuits, such as the PMC 402, and a protocol used by the NPI 210. For example, the master circuits can implement the Advanced eXtensible Interface fourth generation (AXI4) protocol, and the NPI 210 can implement an NPI Protocol. The protocol blocks 410 can also translate the transaction request from the protocol implemented on the NPI 210 to a protocol implemented by the register blocks 212 of the NoC packet switches 206. In some examples, the protocol blocks 410 can translate between NPI Protocol and the Advanced Microcontroller Bus Architecture (AMBA) 3 Advanced Peripheral Bus (APB3) protocol.

As described in further detail subsequently, within and separately for each SoC 101, 102, 103, the PMC 402 may execute instructions stored in the boot ROM 403 to issue transaction requests (e.g., write requests) through the NPI 210 (e.g., the root node 404, interconnected NPI switches 408, and protocol blocks 410) to register blocks 212 of NoC packet switches 206 to initially program the NoC packet switches 206 to initially configure the NoC 106 for that respective SoC 101, 102, 103. The PMC 402 may subsequently reprogram the NoC packet switches 206.

The PMC 402 is further connected to the configuration interconnect 108, which is in turn connected to the programmable logic regions 110. The PMC 402 is configured to program the fabric of the programmable logic regions 110 using, for example, a frame-based programming mechanism through the configuration interconnect 108. The configuration interconnect 108 is a delivery mechanism for programming programmable units on the respective SoC that is independent of the delivery mechanism of the NPI 210 for programming other programmable units (e.g., slave endpoint circuits like the register blocks 212 of the NoC packet switches 206) on the respective SoC 101, 102, 103.

Figure 8:
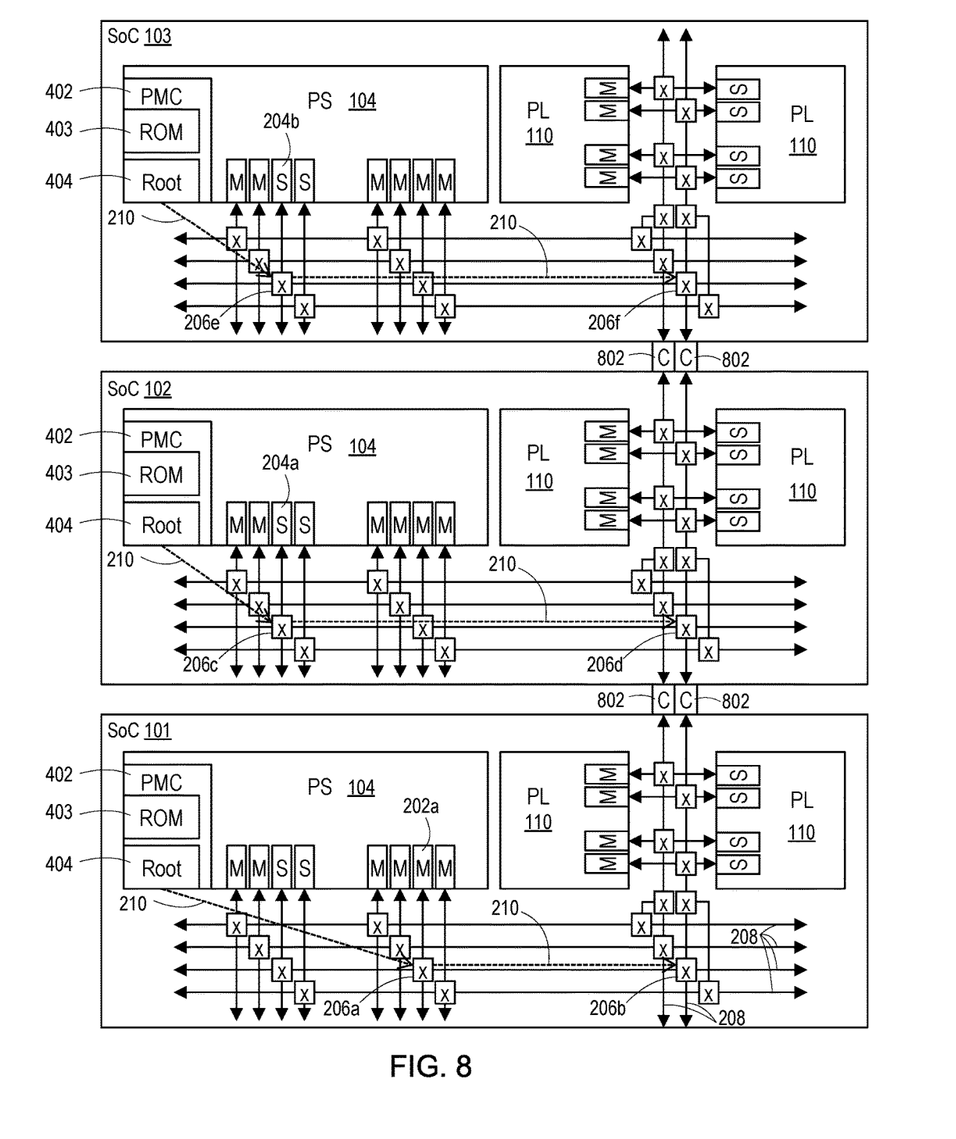
FIG. 8 is a block diagram depicting a multi-chip structure with interconnected NoCs according to an example.

FIG. 8 is a block diagram depicting a multi-chip structure with interconnected NoCs 106 according to an example. FIG. 8 illustrates some aspects of the multi-chip structure of FIG. 2 in more detail while omitting other aspects so as not to obscure aspects described here. Generally, each SoC 101, 102, 103 includes a processing system (PS) 104, programmable logic regions (PL) 110, and components that form a NoC 106. The processing system 104 includes a PMC 402, which further includes boot ROM 403 and a root node 404 of an NPI 210. The processing system 104 and programmable logic regions 110 include various ones of NMUs 202 (boxes labeled with an "M" in FIG. 8) and NSUs 204 (boxes labeled with an "S"). The NoC 106 includes routing 208 and NoC packet switches 206 (boxes labeled with an "x") at various intersections of routing 208. The NMUs 202 are connected to the routing 208, and the NSUs 204 are also connected to the routing 208. The NoC packet switches 206 are capable of being configured to connect and direct communications between various ones of the NMUs 202 and the NSUs 204. The NPI 210 of the NoC 106 is generally illustrated as dashed lines emanating from the root node 404. More specifically, the NPI 210 includes interconnected NPI switches 408 and protocol blocks 410 connected to register blocks 212 of the NoC packet switches 206, as described with respect to FIG. 7 previously.

Routing 208 of each NoC 106 is connected to external connectors 802 to interconnect the NoCs 106 of the SoCs 101, 102, 103. The external connectors 802 can be or include, for example, bumps attaching the respective chips to an interposer and/or metallization layers or redistribution layers on the interposer, such as described with respect to FIG. 1. Routing 208 of the NoC 106 of SoC 101 is connected to routing 208 of the NoC 106 of SoC 102 via external connectors 802, and routing of the NoC 106 of SoC 102 is connected to routing 208 of the NoC 106 of SoC 103 via external connectors 802.

Generally, each SoC 101, 102, 103 undergoes a multi-stage boot sequence. In a first stage, each SoC 101, 102, 103 configures, for example, a minimal number of NoC packet switches 206 to establish communication between the SoCs 101, 102, 103 through the NoCs 106. In some examples described herein, communications between the SoCs 101, 102, 103 only occurs through the interconnected NoCs 106 and external connectors 802, as shown in FIG. 8. With communications between the SoCs 101, 102, 103 established through the NoCs 106, system configuration data for a system-level configuration can be communicated between the SoCs 101, 102, 103 on the interconnected NoCs 106 for configuring programmable components of the SoCs 101, 102, 103, in a second stage of the boot sequence. After the system-level configuration is established, fabric configuration data for programming the fabric of programmable logic regions 110 can be communicated between the SoCs 101, 102, 103 on the interconnected NoCs 106.

In the first stage of the boot sequence, the PMC 402 of each SoC 101, 102, 103 executes boot instructions stored on the boot ROM 403. The execution of these instructions cause the PMC 402 to read data from off-chip of the respective SoC 101, 102, 103. The data can be stored on another chip attached to the interposer to which the chip of the SoC 101, 102, 103 is attached and/or input by a user implementing the SoC 101, 102, 103. In some examples, the data is stored on e-fuses on a memory device attached to the interposer. Various hardened input/output (IO) interfaces may be implemented to read the data from off-chip, which is not specifically illustrated in FIG. 8. The information that is read identifies which NoC packet switches 206 on the respective SoC 101, 102, 103 are to be configured in the first stage, identifies the configuration of those NoC packet switches 206, and identifies where the chip of the respective SoC 101, 102, 103 is in relation to the other chips of the other SoCs 101, 102, 103 (e.g., wherein the chip is in the stack of chips). By being configured to read this information from off-chip, each chip of the SoCs 101, 102, 103 can be manufactured by the same processes, e.g., the chips of the SoCs 101, 102, 103 can be the same, and the arrangement of the chips on, e.g., the interposer can determine what information is read to configure the SoCs 101, 102, 103.

Execution of the instructions from the boot ROM 403 further causes each PMC 402, based on the information that has been read, to transmit memory-mapped transaction requests through the root node 404 and NPI 210 to the register blocks 212 of the NoC packet switches 206 identified by the read information to write information to those register blocks 212 and thereby configure the NoC packet switches 206. With the NoC packet switches 206 configured, communication between the PMCs 402 of the SoCs 101, 102, 103 can commence over the NoCs 106, which can permit inter-chip communication to communicate system-level configuration data, for example. More details are described in the context of the example of FIG. 8.

In the context of FIG. 8, each PMC 402 of the SoCs 101, 102, 103 reads data from off-chip. The PMC 402 of the SoC 101 reads data that indicates that the SoC 101 is to be the master and first chip (e.g., identified as '00') in the configuration of SoCs 101, 102, 103, that two NoC packet switches 206a and 206b are to be configured, and that indicates the identification and configuration of the NoC packet switches 206a and 206b. For example, the identification and configuration for the data that indicates the identification and configuration of the NoC packet switches 206a and 206b can include an identification (e.g., a 9-bit identification) and configuration code (e.g., 2-bit code) of the respective NoC packet switch 206a, 206b. The PMC 402 of the SoC 101 can determine addresses of register blocks 212 of the NoC packet switch 206a, 206b for programming routing tables of the NoC packet switch 206a, 206b based on the identification data that was read, and can determine a configuration of the NoC packet switch 206a, 206b based on the configuration code. The PMC 402 of the SoC 101 then, through the root node 404 and NPI 210 of the SoC 101, writes the configuration and routing tables to register blocks 212 of the NoC packet switches 206a and 206b. For example, the configuration of NoC packet switch 206a can be the first configuration 602 of FIG. 6, and the configuration of NoC packet switch 206b can be the second configuration 604 of FIG. 6. The routing tables of the NoC packet switch 206b can direct memory-mapped packets through different sides of the NoC packet switch 206b based on an address in the respective memory-mapped packet. A chip identification can be appended to addresses of the memory-mapped packets, and the NoC packet switch 206b can direct packets based on the chip identification. For example, packets having a chip identification of '00' (e.g., for the SoC 101) are routed to the fourth side Side 3 of the NoC packet switch 206b, and packets having a chip identification greater than '00' are routed to the first side Side 0 of the NoC packet switch 206b.

The PMC 402 of the SoC 102 reads data that indicates that the SoC 102 is to be a slave and second chip (e.g., identified as '01') in the configuration of SoCs 101, 102, 103, that two NoC packet switches 206c and 206d are to be configured, and that indicates the identification and configuration of the NoC packet switches 206c and 206d, as described above in the context of the SoC 101. The PMC 402 of the SoC 102 can determine addresses of register blocks 212 of the NoC packet switch 206c, 206d for programming routing tables of the NoC packet switch 206c, 206d based on the identification data that was read, and can determine a configuration of the NoC packet switch 206c, 206d based on the configuration code. The PMC 402 of the SoC 102 then, through the root node 404 and NPI 210 of the SoC 102, writes the configuration and routing tables to register blocks 212 of the NoC packet switches 206c and 206d. For example, the configuration of NoC packet switch 206c can be the first configuration 602 of FIG. 6, and the configuration of NoC packet switch 206d can be the second configuration 604 of FIG. 6. The routing tables of the NoC packet switch 206d can direct memory-mapped packets through different sides of the NoC packet switch 206d based on an address in the respective memory-mapped packet. For example, packets having a chip identification of '01' (e.g., for the SoC 102) are routed to the fourth side Side 3 of the NoC packet switch 206d; packets having a chip identification greater than '01' are routed to the first side Side 0 of the NoC packet switch 206d; and packets having a chip identification less than '01' are routed to the third side Side 2 of the NoC packet switch 206d.

The PMC 402 of the SoC 103 reads data that indicates that the SoC 103 is to be a slave and third chip (e.g., identified as '10') in the configuration of SoCs 101, 102, 103, that two NoC packet switches 206e and 206f are to be configured, and that indicates the identification and configuration of the NoC packet switches 206e and 206f, as described above in the context of the SoC 101. The PMC 402 of the SoC 103 can determine addresses of register blocks 212 of the NoC packet switch 206e, 206f for programming routing tables of the NoC packet switch 206e, 206f based on the identification data that was read, and can determine a configuration of the NoC packet switch 206e, 206f based on the configuration code. The PMC 402 of the SoC 103 then, through the root node 404 and NPI 210 of the SoC 103, writes the configuration and routing tables to register blocks 212 of the NoC packet switches 206e and 206f. For example, the configuration of NoC packet switch 206e can be the first configuration 602 of FIG. 6, and the configuration of NoC packet switch 206f can be the second configuration 604 of FIG. 6. The routing tables of the NoC packet switch 206f can direct memory-mapped packets through different sides of the NoC packet switch 206f based on an address in the respective memory-mapped packet. For example, packets having a chip identification of '10' (e.g., for the SoC 102) are routed to the fourth side Side 3 of the NoC packet switch 206f, and packets having a chip identification less than '10' are routed to the third side Side 2 of the NoC packet switch 206f.

With the respective SoCs 101, 102, 103 having configured the NoC packet switches 206a-f, communication can be established between the SoCs 101, 102, 103. For example, the PMC 402 of the SoC 101 can communicate with the PMC 402 of the SoC 102 via the NMU 202a on the processing system 104 of the SoC 101, the NoC packet switches 206a, 206b, 206d, 206c and corresponding routing 208, and the NSU 204a on the processing system 104 of the SoC 102. Similarly, the PMC 402 of the SoC 101 can communicate with the PMC 402 of the SoC 103 via the NMU 202a on the processing system 104 of the SoC 101, the NoC packet switches 206a, 206b, 206d, 206f, 206e and corresponding routing 208, and the NSU 204b on the processing system 104 of the SoC 103. Each PMC 402 has a dedicated portion of the address map of the NoC 106. With this portion of the address map, the PMCs 402 of the SoCs 101, 102, 103 can communicate with each other by including the chip identification (e.g., '00', '01', and '10') in the memory-mapped packet to be communicated via the interconnected NoCs 106. The NoC packet switches 206a-f can route the packets according to the chip identification, as described above. In some examples, the communication via the interconnected NoCs 106 is according to the Advanced eXtensible Interface fourth generation (AXI4) protocol.

With the PMCs 402 of the SoCs 101, 102, 103 being able to communicate between each other, system configuration data can be communicated from the PMC 402 of the SoC 101 to the PMCs of the SoCs 102, 103. For example, the PMC 402 of the SoC 101 can access system configuration data from memory, e.g., flash memory, that is off-chip from the SoC 101. For example, the memory may be the NVM 112 on the memory chip 62 in FIGS. 1 and 2. The SoC 101 can implement any IO interface and other IP to enable the PMC 402 to access the system configuration data from the memory. For example, a memory controller may be connected to the processing system 104 (e.g., to the PMC 402), and the memory controller can be connected through an IO interface to memory. The PMC 402 of the SoC 101 can then communicate this system configuration data to the PMCs 402 of the slave SoCs 102, 103 via the interconnected NoCs 106 (e.g., with the configured NoC packet switches 206a-f).

With the system configuration data communicated to the individual PMCs 402 of the SoCs 101, 102, 103, the NoC 106 can be quiesced locally, and the PMCs 402 on each SoC 101, 102, 103 can further configure components, including the local NoC 106, for system-level operations. The configuration of the NoC packet switches 206a-f may remain or may be changed by the system configuration data. The NoCs 106 of the SoCs 101, 102, 103 can be reconfigured, and such reconfiguration can maintain communication through interconnected NoCs 106 between the SoCs 101, 102, 103. With the configuration of the NoCs 106, various functionality of the NoC packet switches 206 can be configured, such as routing tables, QoS setting, and others.

With the system configured according to the system configuration data, the fabric configuration data can be accessed via the processing system 104 (e.g., PMC 402) of the SoC 101 and communicated to the other processing systems 104 of the SoCs 102, 103. The fabric configuration data may be accessed through an interface with a user device such that the fabric configuration data is downloaded from the user device, or may be accessed from off-chip memory, for example. Appropriate IO interfaces may be implemented to access the fabric configuration data. The processing system 104 (e.g., PMC 402) of the SoC 101 then communicates the fabric configuration data to the other processing systems 104 of the SoCs 102, 103 via the interconnected NoCs 106, which are configured according to the system configuration data, for example.

With the fabric configuration data received at the various processing systems 104 of the SoCs 101, 102, 103, the PMC 402 of the respective processing system 104 programs one or more programmable logic regions 110 via the local configuration interconnect 108 of the respective SoC 101, 102, 103. The programmable logic regions 110 of the SoCs 101, 102, 103 can be subsequently executed, which may permit communication between different programmable logic regions 110 via the NoC 106 of the respective SoC 101, 102, 103 for local communications and/or via the interconnected NoCs of the SoCs 101, 102, 103 for communications between SoCs 101, 102, 103.

Figure 9:
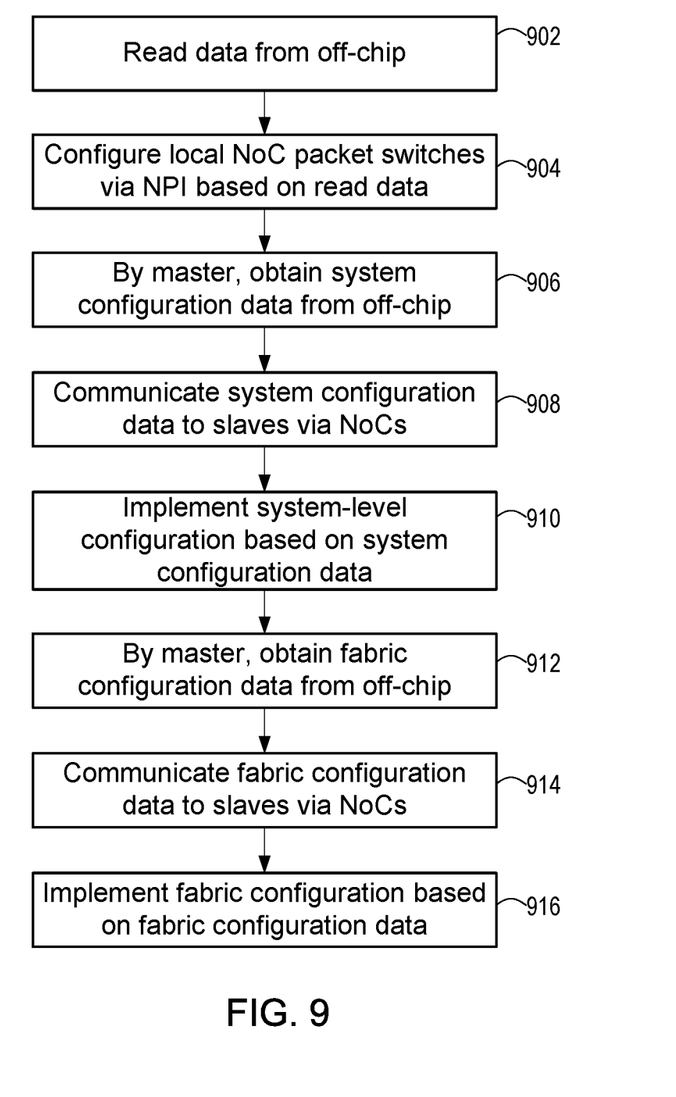
FIG. 9 is a flowchart for operating a multi-chip structure according to an example.

FIG. 9 is a flowchart for operating a multi-chip structure according to an example. At block 902, at each chip, data is read from off-chip. The data indicates, among other things, which NoC packet switches 206 are to be configured on the respective chip and the configuration of those NoC packet switches 206. At block 904, at each chip, the NoC packet switches 206 indicated by the read data are configured via the NPI 210 of the chip and based on the read data. Configuring these NoC packet switches 206 establishes at least a minimal interconnection between the chips through the NoCs 106. At block 906, the master obtains system configuration data from off-chip, and at block 908, the master communicates the system configuration data to the slaves via the interconnected NoCs 106. At block 910, at each chip, a system-level configuration is implemented based on the received system configuration data. At block 912, the master obtains fabric configuration data from off-chip, and at block 914, the fabric configuration data is communicated to slaves via the interconnected NoCs 106. In block 916, the fabric configuration data is implemented in the fabric of the respective SoC (e.g., in the programmable logic region(s)) based on the fabric configuration data.

With the NoCs 106 configured on and interconnected between the SoCs 101, 102, 103, a master PMC 402 (such as the PMC 402 on the SoC 101) can communicate with programmable slave endpoint circuits on other SoCs 101, 102, 103 via the interconnected NoCs 106 and the NPI 210 local to the SoC 101, 102, 103 of the respective programmable slave endpoint circuit. The NoCs 106 can be configured for such communications by the first stage boot sequence to establish minimal interconnections for communications between the SoCs 101, 102, 103 and/or by the second stage boot sequence to establish a system-level configuration. Referring back to FIG. 7, register blocks 212 were described as being in the NoC packet switches 206 for configuring the NoC packet switches 206. In other examples, other programmable slave endpoint circuits can also include register blocks 212 for configuring those slave endpoint circuits or maintaining data generated by those slave endpoint circuits, such as performance data. Some example programmable slave endpoint circuits can include a memory controller, a clock generator, a temperature sensor, etc.

For example, assume that the processing system 104 of the SoC 101 needs to re-configure or read data from a clock generator on the SoC 102. The processing system 104 (e.g., PMC 402) of the SoC 101 creates a memory-mapped transaction request (e.g., an AXI4 read or write request), and transmits that memory-mapped transaction request from an NMU 202 (e.g., NMU 202a) into the NoC 106 on the SoC 101. The NoC packet switches 206 of the NoC 106 of the SoC 101 route the memory-mapped transaction request to external connectors 802, which are connected to the NoC 106 of the SoC 102. The NoC packet switches 206 of the NoC 106 of the SoC 102 then route the memory-mapped transaction request to an NSU 204 (e.g., NSU 204a) of the processing system 104 of the SoC 102. The PMC 402 of the processing system 104 of the SoC 102 then passes the memory-mapped transaction request to the root node 404, which translates the memory-mapped transaction request to another format implemented on the NPI 210 of the SoC 102. The root node 404 of the SoC 102 transmits the translated memory-mapped transaction request through the interconnected NPI switches 408 and appropriate protocol block 410 of the NPI 210 on the SoC 102 to the clock generator on the SoC 102. The clock generator can process the transaction request and transmit a response. The response can be communicated along the same route in reverse order, e.g., through the protocol block 410, interconnected NPI switches 408, and root node 404 of the NPI 210, PMC 402, NSU 204, and NoC 106 on the SoC 102, and the NoC 106 and NMU 202 to the processing system 104 on the SoC 101.

Figure 10:
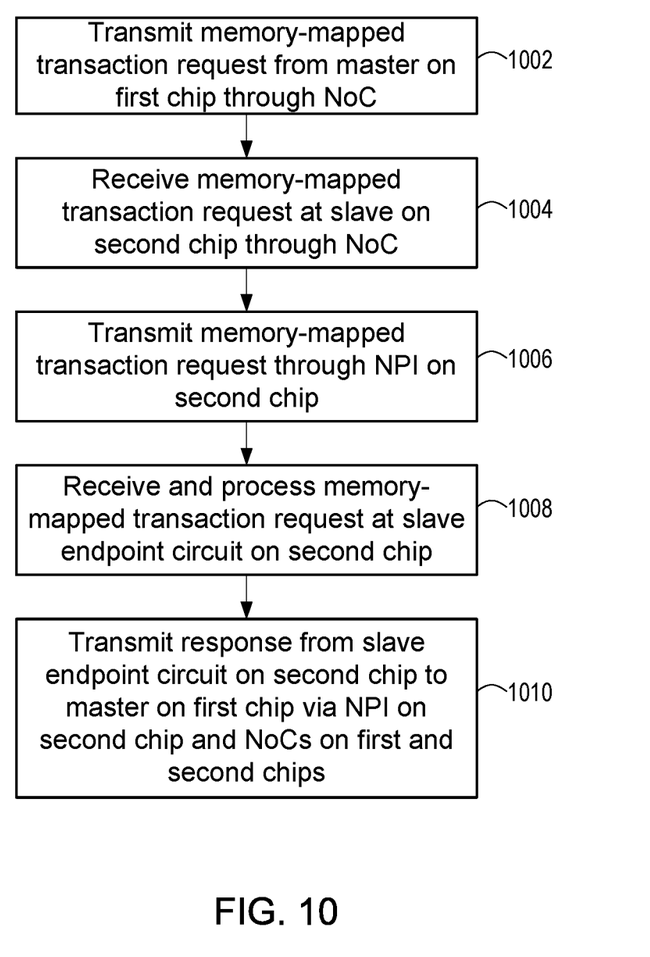
FIG. 10 is a flowchart for operating a multi-chip structure according to an example.

FIG. 10 is a flowchart for operating a multi-chip structure according to an example. At block 1002, a memory-mapped transaction request is transmitted from a master on a first chip through a NoC 106 on the first chip. The NoC 106 on the first chip is connected to a NoC 106 on a second chip. At block 1004, the memory-mapped transaction request is received at a slave on the second chip through the NoC 106 on the second chip. At block 1006, the memory-mapped transaction request is transmitted through an NPI 210 on the second chip. At block 1008, the memory-mapped transaction request is received and processed at the slave endpoint circuit on the second chip. At block 1010, the slave endpoint circuit on the second chip transmits a response to the memory-mapped transaction request to the master on the first chip via the NPI 210 on the second chip and the NoCs 106 on the first and second chips.

Examples described herein can achieve benefits. For example, configuration data of the SoCs can be moved off-chip from the SoCs, thereby reducing space and resources on the SoC. Memory chips may be easily and cheaply manufactured and programmed, and separate chips of the SoCs and memory chips may reduce cost and complexity of producing the systems. Further, by implementing a configurable NoC, a flexible, low-overhead communications interconnect can be implemented in the SoCs. The information read from off-chip by the chips can enable a minimal configuration for the NoCs to establish communications between the SoCs to permit communications for further configuration. Other benefits and advantages may be obtained by various examples.

While the foregoing is directed to specific examples, other and further examples may be devised without departing from the basic scope thereof, and the scope thereof is determined by the claims that follow.

What is claimed is:

1. An apparatus comprising:
a first chip comprising a first processing system and a first configurable Network-on-Chip (NoC) connected to the first processing system; and
a second chip comprising a second processing system and a second configurable NoC connected to the second processing system; and
wherein:
the first configurable NoC is connected to the second configurable NoC via an external connector;
the first processing system is operable to obtain first information from off of the first chip and configure the first configurable NoC based on the first information;
the second processing system is operable to obtain second information from off of the second chip and configure the second configurable NoC based on the second information; and
the first processing system and the second processing system are communicatively coupled with each other via the first configurable NoC and the second configurable NoC when the first configurable NoC and the second configurable NoC are configured based on the first information and the second information, respectively.

2. The apparatus of claim 1 further comprising an interposer, the first chip and the second chip each being attached to the interposer, the external connector being on the interposer.

3. The apparatus of claim 1, wherein:
the first processing system comprises a first controller and first read-only memory (ROM);
executing instructions stored on the first ROM by the first controller causes the first controller to obtain the first information from off of the first chip and configure the first configurable NoC;
the second processing system comprises a second controller and second ROM; and
executing instructions stored on the second ROM by the second controller causes the second controller to obtain the second information from off of the second chip and configure the second configurable NoC.

4. The apparatus of claim 1, wherein:
the first configurable NoC comprises first routing and first switches connected to the first routing;
the first switches comprise respective first programmable register blocks to configure functionality of the first switches;
the first processing system is operable to write at least some of the first information to at least some of the first programmable register blocks to configure the first configurable NoC based on the first information;
the second configurable NoC comprises second routing and second switches connected to the second routing;
the second switches comprise respective second programmable register blocks to configure functionality of the second switches; and
the second processing system is operable to write at least some of the second information to at least some of the second programmable register blocks to configure the second configurable NoC based on the second information.

5. The apparatus of claim 1, wherein:
the first configurable NoC comprises a first peripheral interconnect connected between the first processing system and first configurable components of the first configurable NoC, the first processing system being operable to configure the first configurable components of the first configurable NoC via the first peripheral interconnect; and
the second configurable NoC comprises a second peripheral interconnect connected between the second processing system and second configurable components of the second configurable NoC, the second processing system being operable to configure the second configurable components of the second configurable NoC via the second peripheral interconnect.

6. The apparatus of claim 5, wherein the first processing system is operable to communicate with a programmable component of the second chip via the first configurable NoC, the second configurable NoC, the second processing system, and the second peripheral interconnect.

7. The apparatus of claim 1, wherein:
the first processing system and the second processing system are operable to communicate configuration data via the first configurable NoC and the second configurable NoC when the first configurable NoC and the second configurable NoC are configured based on the first information and the second information, respectively;
the first processing system is operable to further configure the first configurable NoC based on the configuration data; and
the second processing system is operable to further configure the second configurable NoC based on the configuration data.

8. The apparatus of claim 1, wherein:
the first chip further comprises a first programmable logic region and a first configuration interconnect connected between the first processing system and the first programmable logic region;
the first processing system being operable to configure the first programmable logic region via the first configuration interconnect;
the second chip further comprises a second programmable logic region and a second configuration interconnect connected between the second processing system and the second programmable logic region; and
the second processing system being operable to configure the second programmable logic region via the second configuration interconnect.

9. A method for operating multiple integrated circuits, the method comprising:
configuring, locally at each chip of multiple chips by a controller of the respective chip, a configurable Network-on-Chip (NoC) of the respective chip based on initial configuration data, wherein the configurable NoCs of the multiple chips are connected via external connectors external to the multiple chips;
communicating system configuration data between the controllers of the multiple chips via the configurable NoCs of the multiple chips configured based on the initial configuration data; and
configuring, locally at each chip by the controller of the respective chip, the configurable NoC of the respective chip based on the system configuration data.

10. The method of claim 9 further comprising:
communicating fabric configuration data between the controllers of the multiple chips via the configurable NoCs of the multiple chips configured based on the system configuration data; and
configuring, locally at each chip by the controller of the respective chip, one or more programmable logic regions of the respective chip based on the fabric configuration data, wherein the configurable NoC of the respective chip is not used to configure the one or more programmable logic regions.

11. The method of claim 9, wherein configuring the configurable NoC of the respective chip based on the initial configuration data and the system configuration data each includes communicating between the controller of the respective chip and first programmable components of the configurable NoC of the respective chip via a peripheral interconnect.

12. The method of claim 11 further comprising communicating between the controller of a first chip of the multiple chips and a second programmable component of a second chip of the multiple chips via the configurable NoCs of the first chip and the second chip configured based on the initial configuration data or the system configuration data and via the peripheral interconnect of the second chip.

13. The method of claim 9, wherein the initial configuration data is obtained by each controller of the multiple chips from off-chip from the respective chip.

14. The method of claim 9, wherein each configurable NoC of the multiple chips includes:
   egress circuits;
   ingress circuits;
   programmable switches; and
   routing, wherein the programmable switches are interconnected by the routing, the interconnected programmable switches and routing being connected to and between the egress circuits and the ingress circuits.

15. The method of claim 14, wherein the programmable switches each include a register block, the register block being writable to program the programmable switches.

16. A method for operating multiple integrated circuits, the method comprising:
   communicatively connecting a first processing system on a first chip to a second processing system on a second chip via a first configurable Network-on-Chip (NoC) on the first chip and a second configurable NoC on the second chip;
   transmitting a first transaction request from the first processing system through the first configurable NoC and the second configurable NoC to the second processing system; and
   transmitting a second transaction request corresponding to the first transaction request from the second processing system to a configurable component on the second chip via a peripheral interconnect on the second chip, wherein the second processing system is operable to configure the second configurable NoC via the peripheral interconnect.

17. The method of claim 16 further comprising translating, by the second processing system, the first transaction request into the second transaction request.

18. The method of claim 16, wherein the configurable component on the second chip is in a circuit block that is not part of the second configurable NoC.

19. The method of claim 16, wherein communicatively connecting the first processing system to the second processing system comprises:
   configuring, locally at the first chip by the first processing system, the first configurable NoC based on initial configuration data obtained by the first processing system from off of the first chip; and
   configuring, locally at the second chip by the second processing system, the second configurable NoC based on initial configuration data obtained by the second processing system from off of the second chip.

20. The method of claim 16, wherein configuring the second configurable NoC comprises configuring, by the second processing system, programmable switches of the second configurable NoC via the peripheral interconnect.

* * * * *